United States Patent
Ohtsuki

(10) Patent No.: US 7,862,242 B2
(45) Date of Patent: Jan. 4, 2011

(54) WHEEL BEARING APPARATUS FOR A VEHICLE

(75) Inventor: Hisashi Ohtsuki, Iwata (JP)

(73) Assignee: NTN Corporation (JP)

( * ) Notice: Subject to any disclaimer, the term of this patent is extended or adjusted under 35 U.S.C. 154(b) by 48 days.

(21) Appl. No.: 12/465,137

(22) Filed: May 13, 2009

(65) Prior Publication Data
US 2009/0232435 A1   Sep. 17, 2009

Related U.S. Application Data

(63) Continuation of application No. PCT/JP2007/001236, filed on Nov. 13, 2007.

(30) Foreign Application Priority Data

Nov. 14, 2006 (JP) .............................. 2006-308300

(51) Int. Cl.
   *F16C 33/58*   (2006.01)
(52) U.S. Cl. ...................... 384/544; 384/516
(58) Field of Classification Search ................. 384/544, 384/516, 513, 450
   See application file for complete search history.

(56) References Cited

U.S. PATENT DOCUMENTS

| | | | | |
|---|---|---|---|---|
| 5,051,004 A | * | 9/1991 | Takeuchi et al. | 384/516 |
| 5,226,737 A | * | 7/1993 | Sandy, Jr. | 384/544 |
| 5,501,530 A | * | 3/1996 | Nagai et al. | 384/516 |
| 7,104,695 B2 | * | 9/2006 | Shevket | 384/450 |
| 7,614,796 B2 | * | 11/2009 | Hattori et al. | 384/544 |
| 2005/0018939 A1 | | 1/2005 | Niwa et al. | |

FOREIGN PATENT DOCUMENTS

| | | |
|---|---|---|
| EP | 1 500 524 A2 | 1/2005 |
| JP | 11-129703 | 5/1999 |
| JP | 2003-232343 | 8/2003 |
| JP | 2004-108449 | 4/2004 |
| JP | 2005-061616 | 3/2005 |

* cited by examiner

*Primary Examiner*—Thomas R Hannon
(74) *Attorney, Agent, or Firm*—Harness, Dickey & Pierce, P.L.C.

(57) ABSTRACT

A vehicle wheel bearing apparatus has an outer member formed, on its inner circumference, with double row outer raceway surfaces. An inner member is formed on its outer circumference surface, with double row inner raceway surfaces arranged opposite to the double row outer raceway surfaces. Double ball groups are freely rollably contained between the outer raceway surfaces and inner raceway surfaces, respectively, of the outer member and the inner member. It is formed as a double row angular contact ball bearing of back-to-back duplex type where a predetermined contacting angle is applied to each ball. A pitch circle diameter of the outer-side ball group is larger than a pitch circle diameter of the inner-side ball group. The outer-side groove diameter of curvature ratios are smaller than inner-side groove diameter of curvature ratios.

5 Claims, 3 Drawing Sheets

[Fig 1]
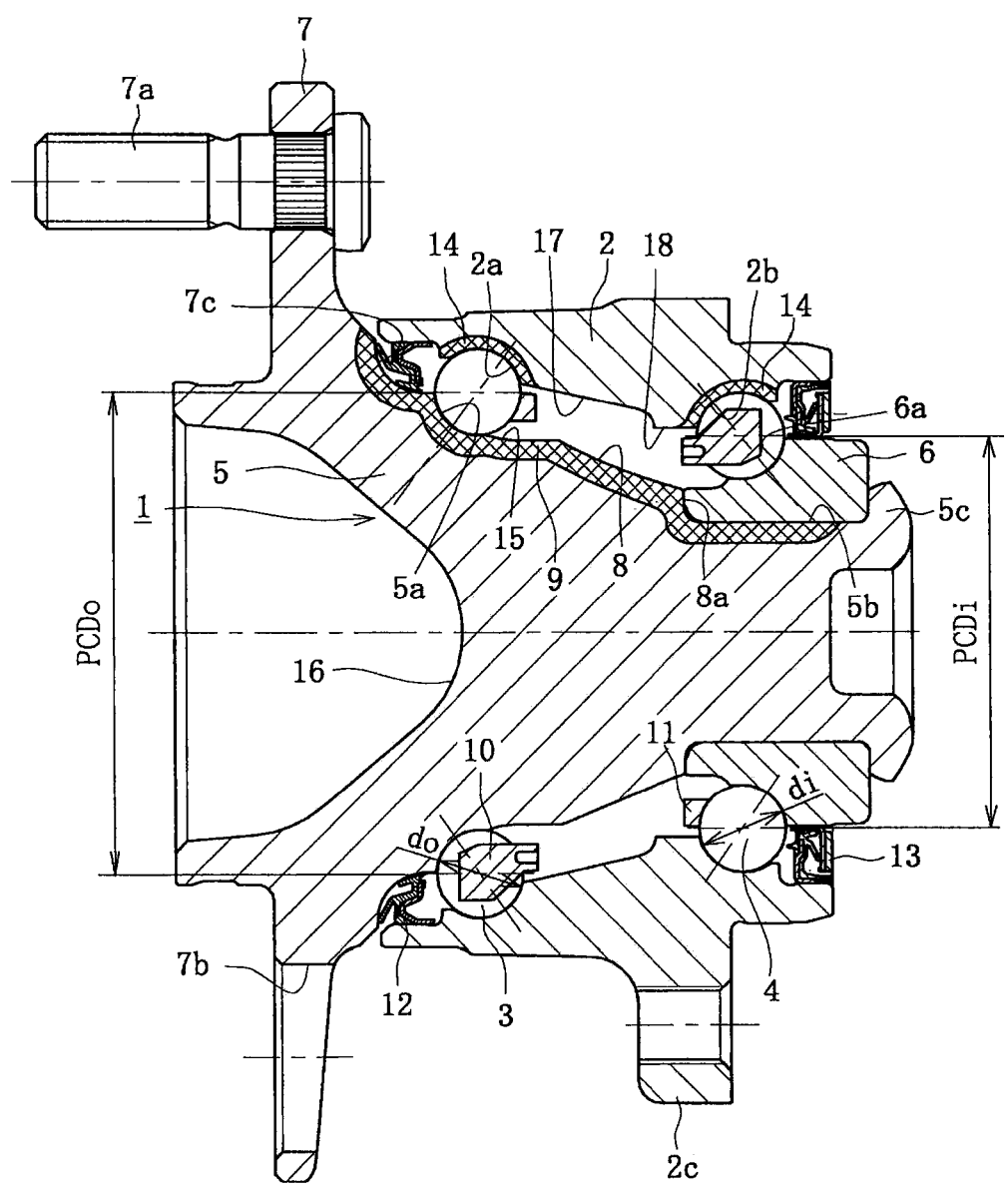

[Fig 2]
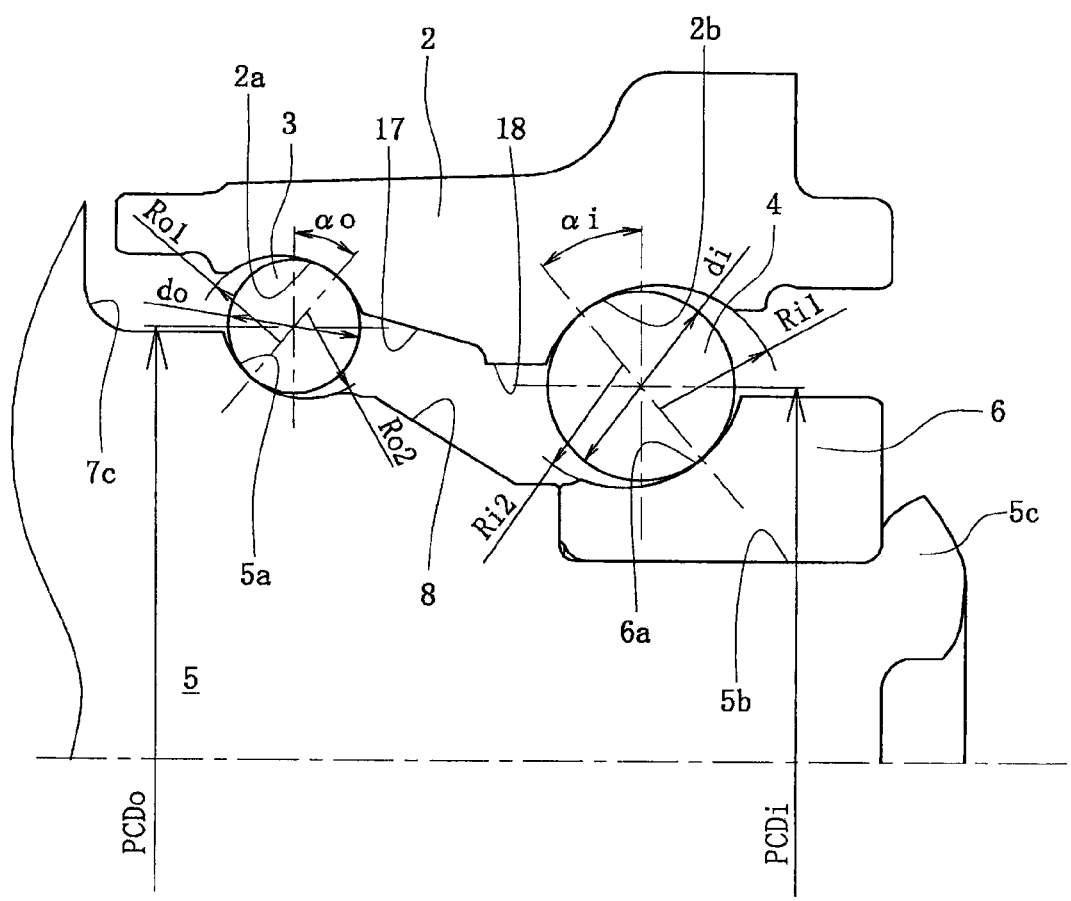

[Fig 3]
PRIOR ART
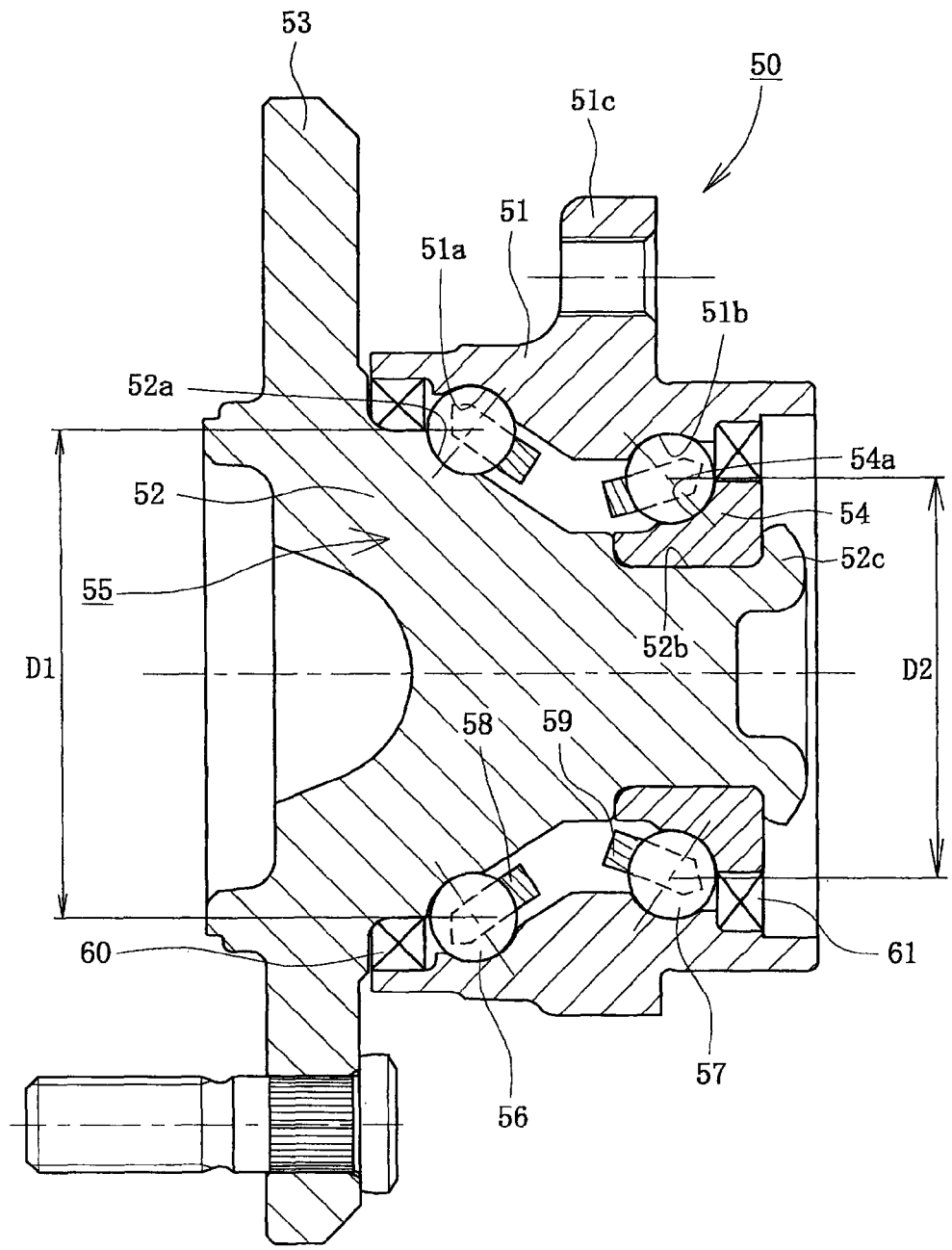

WHEEL BEARING APPARATUS FOR A VEHICLE

CROSS-REFERENCE TO RELATED APPLICATIONS

This application is a continuation of International Application No. PCT/JP2007/001236, filed Nov. 13, 2007, which claims priority to Japanese Application No. 2006-308300, filed Nov. 14, 2006. The disclosures of the above applications are incorporated herein by reference.

FIELD

The present disclosure relates to a wheel bearing apparatus that freely rotationally supports a wheel of a vehicle, such as an automobile and, more particularly, to a vehicle wheel bearing apparatus intended to simultaneously achieve a reduction of its size and weight as well as increase its strength and rigidity to improve its durability.

BACKGROUND

Usually, a wheel bearing apparatus is used to freely rotationally support a wheel hub that mounts the wheel, via a rolling bearing, for driving wheels and driven wheels. For structural reasons, an inner ring rotation type is generally adopted for a driving wheel and both an inner ring rotation and outer ring rotation types are adopted for a driven wheel. Double row angular contact ball bearings are widely used in such a bearing apparatus. Reasons for this is that they have a desirable bearing rigidity, high durability against misalignment and small rotation torque to improve the fuel consumption. The double row angular contact ball bearing has a structure where a plurality of balls is interposed between a stationary ring and a rotational ring. A predetermined contacting angle is applied to the balls relative to the stationary and rotational rings.

The bearing apparatus for a wheel of a vehicle is broadly classified into a first-fourth generation structure. In a first generation type, a wheel bearing with a double row angular contact ball bearing is fit between a knuckle forming part of a suspension and a wheel hub. In a second generation structure, a body mounting flange or a wheel mounting flange is directly formed on the outer circumference of an outer member. In a third generation structure, one of the inner raceway surfaces is directly formed on the outer circumference of the wheel hub. In a fourth generation structure, the inner raceway surfaces are directly formed on the outer circumference of the wheel hub and the constant velocity universal joint.

In prior art wheel bearing apparatus formed with a double row rolling bearing, since both bearing row arrangements are the same in the double row bearing, the apparatus has a sufficient rigidity during straight way running, however, optimum rigidity cannot always be obtained during curved way running. The positional relationship between the wheels and the bearing apparatus is usually designed so that the weight of the vehicle acts at substantially the center between the rows of bearing balls during the straight way running. However, a larger radial load and a larger axial load are applied to vehicle axles on the side opposite to the curving direction (i.e. axles of the left hand side of vehicle when right hand curving). Accordingly, it is effective to have a larger rigidity on the bearing row of the outer-side than that of the bearing row of the inner-side in order to improve the durability and strength of the bearing apparatus. Thus, a known vehicle wheel bearing apparatus is shown in FIG. 3 that can have a high rigidity without enlargement of the bearing apparatus. In the description below, the term "outer-side" (left hand side in the drawings) of the apparatus denotes a side that is positioned outside of the vehicle body. The term "inner-side" (right hand side in the drawings) of the apparatus denotes a side that is positioned inside of the body when the bearing apparatus is mounted on the vehicle body.

The vehicle wheel bearing apparatus 50 is formed with a double row angular contact ball bearing including an outer member 51 integrally formed on its outer circumference with a body mounting flange 51c. The flange 51c is mounted on a knuckle (not shown) of a vehicle. Its inner circumference includes double row outer raceway surfaces 51a, 51b. An inner member 55 includes a wheel hub 52 with a wheel mounting flange 53 integrally formed at one end for mounting a wheel (not shown). One inner raceway surface 52a is formed on the outer circumference of the wheel hub opposite to one 51a of the double row outer raceway surfaces 51a, 51b. A cylindrical portion 52b axially extends from the inner raceway surface 52a. An inner ring 54 is fit onto the cylindrical portion 52b. The inner ring includes an outer circumference with the other inner raceway surface 54a opposite to the other raceway surface 51b of the double row outer raceway surfaces 51a, 51b. Double row balls 56, 57 are freely rollably contained between the outer raceway surfaces 51a, 51b and inner raceway surfaces 52a, 54a of the inner member 55. Cages 58, 59 rollably hold the balls 56, 57.

The inner ring 54 is axially immovably secured by a caulked portion 52c. The caulked portion 52c is formed by radially outwardly plastically deforming the cylindrical portion 52b of the wheel hub 52. Seals 60, 61 are mounted in annular openings formed between the outer member 51 and the inner member 55. The seals 60, 61 prevent leakage of grease contained within the bearing apparatus and the entry of rain water or dusts into the bearing apparatus from the outside.

A pitch circle diameter D1 of the outer-side ball group 56 is set larger than a pitch circle diameter D2 of the inner-side ball group 57. Accordingly, the diameter of the inner raceway surface 52a of the wheel hub 52 is larger than the diameter of the inner raceway surface 54a of the inner ring 54. The outer raceway surface 51a of the outer-side of the outer member 51 is larger than that of the outer raceway surface 51b of the inner-side of the outer member 51. Also, the number of outer-side balls 56 is larger than the number of the inner-side balls 57. By setting the pitch circle diameter D1 of the outer-side larger than the pitch circle diameter D2 of the inner-side (D1>D2), it is possible to obtain a large rigidity of the bearing apparatus 50. Thus, this extends the life of the bearing. (Japanese Laid-open Patent Publication No. 108449/2004).

In the prior art wheel bearing apparatus 50, the pitch circle diameter D1 of the outer-side ball group 56 is set larger than the pitch circle diameter D2 of the inner-side ball group 57. Accordingly, the diameter of the outer-side outer raceway surface 51a of the outer member 51 is larger than that of the inner-side outer raceway surface 51b of the outer member 51. Additionally, the number of the outer-side balls 56 is larger than the number of the inner-side balls 57. This improves the rigidity of the outer-side bearing row and thus extends the life of the wheel bearing apparatus 50. However, to the contrary, since the bearing life of the inner-side ball group 57 becomes disadvantageous as compared with the outer-side ball group 56, it has been desired to solve this problem and to provide a wheel bearing apparatus for a vehicle that can simultaneously achieve reduction of its size and weight and increase its strength and rigidity to improve its durability.

SUMMARY

It is, therefore, an object of the present disclosure to provide a vehicle wheel bearing apparatus that can simultaneously achieve reduction of its size and weight while increasing its strength and rigidity to improve its durability.

To achieve the object, a vehicle wheel bearing apparatus comprises an outer member formed with double row outer raceway surfaces on its inner circumference. An inner member is formed with double row inner raceway surfaces on its outer circumferential surface. The double row inner raceway surfaces are arranged opposite to the double row outer raceway surfaces. Double row ball groups are freely rollably contained between the outer raceway surfaces and inner raceway surfaces, respectively, of the outer member and the inner member. The bearing is formed as a double row angular contact ball bearing of a back-to-back duplex type where a predetermined contacting angle is applied to each ball. A pitch circle diameter of the outer-side ball group is larger than a pitch circle diameter of the inner-side ball group. The outer-side groove diameter of curvature ratios is smaller than inner-side groove diameter of curvature ratios.

Vehicle wheel bearing apparatus of the first through fourth generation type are formed with a double row angular contact ball bearing that includes double row ball groups. Additionally, a pitch circle diameter of the outer-side ball group is larger than a pitch circle diameter of the inner-side ball group. The outer-side groove diameter of curvature ratios is smaller than inner-side groove diameter of curvature ratios. Thus, it is possible to reduce the contact bearing pressure (contact surface pressure) in the outer-side raceway surfaces caused by contact with the outer-side balls. This increases the strength and rigidity of the outer-side bearing row as well as reducing the elliptical path of contact on the inner-side raceway surfaces caused by contact with the inner-side balls. Thus, this prevents the phenomenon of "over-riding on the shoulder" (that is, a phenomenon where the elliptical path of contact of the balls rides over the raceway surface and come out). Thus, the bearing life of the inner-side bearing row is also improved.

The diameter of each outer-side ball is smaller than the diameter of each inner-side ball. This effectively achieves practical use of the bearing space in order to reduce the size and weight of the bearing apparatus while increasing its strength and rigidity to improve its durability.

The number of outer-side balls is larger than the number of inner-side balls. This makes it possible to further extend the bearing life while increasing the bearing rigidity of the outer-side bearing row.

The inner member includes the wheel hub with a wheel mounting flange at one end. Also, it has an outer circumferential surface with one inner raceway surface arranged opposite to one of the double row outer raceway surfaces. The cylindrical portion axially extends from the inner raceway surface, via a tapered shaft-shaped portion. An inner ring is press fit onto the cylindrical portion via a predetermined interference. The inner ring outer circumferential surface has the other inner raceway surface arranged opposite to the other of the double row outer raceway surfaces. A substantially conical recess is formed on the outer-side end of the wheel hub. The depth of the recess extends to at least a position near the bottom of the inner raceway surface of the wheel hub. The recess is formed so that the wall thickness of the wheel hub, at its outer-side end portion, is substantially constant. This reduces the size and weight of the inner member.

A predetermined hardened layer is formed on the outer circumference of the wheel hub in a region including the inner raceway surface of the wheel hub from a base portion of the wheel mounting flange to the cylindrical portion. The hardened layer is formed by high frequency induction quenching. This increases the strength and rigidity of the wheel hub and thus improves its durability.

The vehicle wheel bearing apparatus of the present disclosure has an outer member formed with double row outer raceway surfaces on its inner circumference. An inner member is formed with double row inner raceway surfaces on its outer circumferential surface. The double row inner raceway surfaces are arranged opposite to the double row outer raceway surfaces. Double ball groups are freely rollably contained between the outer raceway surfaces and inner raceway surfaces, respectively, of the outer member and the inner member. The bearing is formed as a double row angular contact ball bearing of the back-to-back duplex type where a predetermined contacting angle is applied to each ball. A pitch circle diameter of the outer-side ball group is larger than a pitch circle diameter of the inner-side ball group. The outer-side groove diameter of curvature ratios is smaller than inner-side groove diameter of curvature ratios. Accordingly, it is possible to reduce the contact bearing pressure (contact surface pressure) in the outer-side raceway surfaces caused by contact with the outer-side balls. This increases the strength and rigidity of the outer-side bearing row as well as minimizing the elliptical path of contact on the inner-side raceway surfaces caused by contact with the inner-side balls. Thus, this prevents the phenomenon of "over-riding on the shoulder" so that the bearing life of the inner-side bearing row is also improved. Accordingly, it is possible to provide a vehicle wheel bearing apparatus that can simultaneously achieve reduction of its size and weight and increase its strength and rigidity to improve its durability.

A vehicle wheel bearing apparatus comprises an outer member formed with a body mounting flange on its outer circumstance. The body mounting flange is to be mounted on a knuckle. The outer member inner circumference has double row outer raceway surfaces. An inner member includes a wheel hub and an inner ring. The wheel hub has an integrally formed wheel mounting flange at one end. The wheel hub on its outer circumference includes one inner raceway surface arranged opposite to one of the double row outer raceway surfaces. A cylindrical portion axially extends from the inner raceway surface. The inner ring is adapted to fit onto the cylindrical portion of the wheel hub. The inner ring is formed on its outer circumference with the other inner raceway surface arranged opposite to the other of the double row outer raceway surfaces. Double row rolling elements are freely contained between the outer and inner raceway surfaces, respectively, of the outer member and the inner member. It is formed as a double row angular contact ball bearing of back-to-back duplex type where a predetermined contacting angle is applied to each ball. A pitch circle diameter of the outer-side ball group is larger than a pitch circle diameter of the inner-side ball group. The diameter of each outer-side ball is smaller than the diameter of each inner-side ball. The outer-side groove diameter of curvature ratios is smaller than inner-side groove diameter of curvature ratios.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a preferred embodiment of a vehicle wheel bearing apparatus.

FIG. 2 is an explanatory cross-section view of a bearing portion in FIG. 1.

FIG. 3 is a prior art longitudinal section view of a vehicle wheel bearing apparatus.

DETAILED DESCRIPTION

One preferred embodiment of the present disclosure will be hereinafter described with reference to the drawings.

FIG. 1 is a longitudinal section view of an embodiment of a vehicle wheel bearing apparatus. FIG. 2 is an explanatory view of the bearing portion of FIG. 1. FIG. 3 is a longitudinal section view of a prior art bearing apparatus.

The vehicle bearing apparatus of the present disclosure shown in FIG. 1 is a third generation type used for a driven wheel. It includes an inner member 1, an outer member 2, and double row ball groups 3, 4 rollably contained between the inner and outer members 1, 2. The inner member 1 includes the wheel hub 5 and an inner ring 6 press fit on the wheel hub 5, via a predetermined interference.

The wheel hub 5 is integrally formed with a wheel mounting flange 7 at its outer-side end. One (outer-side) inner raceway surface 5a, of a circular arc cross-section, is formed on its outer circumference. A cylindrical portion 5b extends from the inner raceway surface 5a through a shaft-shaped portion 8. Hub bolts 7a are arranged on the wheel mounting flange 7 equidistantly along the periphery of the wheel mounting flange 7. Circular apertures 7b are formed between the hub bolts 7a. These circular apertures 7b contribute not only to reduction of weight of the bearing apparatus but to passage of any fastening tool used to assemble and disassemble the bearing apparatus.

The inner ring 6 is formed on its outer circumference with the other (inner-side) inner raceway surface 6a with a circular arc cross-section. It is adapted to be press fit onto the cylindrical portion 5b of the wheel hub 5 to form a double row angular contact ball bearing of the back-to-back duplex type. The inner ring 6 is axially secured by a caulked portion 5c that is formed by plastically deforming the end of the cylindrical portion 5b. The inner ring 6 and balls 3, 4 are made of high carbon chrome steel such as SUJ2. They are hardened to their core by dip quenching to have a surface hardness of about 58~64 HRC.

The wheel hub 5 is made of medium/high carbon steel including carbon of 0.40~0.80% by weight such as S53C. It is hardened by high frequency induction quenching so that a region including the inner raceway surface 5a from the inner-side base 7c of the wheel mounting flange 7 to the cylindrical portion 5b is formed with a hardened layer 9 (shown by cross-hatching in an upper half of FIG. 1). The hardened layer 9 has a surface hardness of 58~64 HRC. The caulked portion 5c remains with its surface hardness after forging. Accordingly, the wheel mounting flange 7 has a sufficient mechanical strength against rotary bending loads applied to it. Also, the anti-fretting strength of the cylindrical portion 5b at a region press fit by the inner ring 6 can be improved. The plastic deforming working of a caulked portion 5c can also be carried out without any micro crack during the caulking process.

The outer member 2 is integrally formed on its outer circumference with a body mounting flange 2c. The flange 2c is to be mounted on a knuckle (not shown) of a vehicle. The outer member inner circumference has an outer-side outer raceway surface 2a, with a circular arc cross-section, opposite to the inner raceway surface 5a of the wheel hub 5. Also, it has an inner-side outer raceway surface 2b, with a circular arc cross-section, opposite to the inner raceway surface 6a of the inner ring 6. Double row ball groups 3, 4 are contained between the outer and inner raceway surfaces and rollably held by cages 10, 11. Seals 12, 13 are mounted within annular space openings formed between the outer member 2 and the inner member 1. The seals 12, 13 prevent leakage of grease contained in the bearing and the entry of rain water and dusts into the bearing from the outside.

The outer member 2 is made of medium/high carbon steel including carbon of 0.40~0.80% by weight such as S53C. The double row outer raceway surfaces 2a, 2b are formed with a hardened layer 14 (shown by cross-hatching in an upper half in FIG. 1). They are hardened by high frequency induction quenching to have a surface hardness of 58~64 HRC. Although the structure shown here is a bearing apparatus of the third generation type for a driven wheel, it is possible to apply the present disclosure to any one of the first through fourth generation types irrespective of the driven wheel or a driving wheel.

A pitch circle diameter PCDo of the outer-side ball group 3 is set larger than a pitch circle diameter PCDi of the inner-side ball group 4. In addition, the diameter "do" of each outer-side ball 3 is set smaller than the diameter ("di") of each inner-side ball 4 (do<di). The number of the outer-side balls 3 is larger than the number of the inner-side balls 4. This effectively achieves a practical use of the bearing space in order to reduce the size and weight of the bearing apparatus while increasing its strength and rigidity to improve its durability.

The wheel hub 5 has an outline configuration continued from a groove bottom of the inner raceway surface 5a to the cylindrical portion 5b through a counter portion 15. A tapered shaft-shaped portion 8 axially extends from the counter portion 15 to a shoulder 8a, against which the inner ring 6 abuts. A substantially axially extending conical recess 16 is formed at an outer-side end portion of the wheel hub 5. The recesses reduce the weight of the bearing apparatus. The recess 16 is formed by forging. The depth of the recess 16 extends to at least near the bottom of the outer-side inner raceway surface 5a of the wheel hub 5. Thus, the outer-side end portion of the wheel hub 5 has a substantially constant wall thickness.

The outer member 2 has the outer-side outer raceway surface 2a formed with a larger diameter than the diameter of the inner-side outer raceway surface 2b. This is due to the difference of the pitch circle diameters PCDo and PCDi. A tapered shoulder portion 17 and a cylindrical shoulder portion 18 are formed between the outer-side outer raceway surface 2a and the inner-side outer raceway surface 2b.

In addition, a diameter of curvature of a groove (hereinafter simply referred to as a "groove diameter of curvature") of each raceway surface is different from each other in the outer-side inner and outer raceway surfaces 5a, 2a and the inner-side inner and outer raceway surfaces 6a, 2b, respectively, corresponding to the diameter "do" of the outer-side ball 3 and the diameter "di" of the inner-side ball 4. This will be described in more detail with reference to FIG. 2. Here the groove radius of curvature of the outer-side outer raceway surface 2a and the outer-side inner raceway surface 5a are designated, respectively, as Ro1 and Ro2. Similarly, the groove radius of curvature of the inner-side outer raceway surface 2b and the inner-side inner raceway surface 6a are designated, respectively, as Ri1 and Ri2. A ratio of the groove diameter of curvature (2·Ro1) relative to the ball diameter (do) in the outer raceway surface 2a of the outer-side row (2·Ro1/do) is designated as A1 (hereinafter, "a ratio of the groove diameter of curvature relative to the ball diameter" is simply referred to as a "groove diameter of curvature ratio"). Similarly, a groove diameter of curvature ratio in the inner raceway surface 5a of the outer-side row (2·Ro2/do) is designated as A2. Furthermore, a groove diameter of curvature ratio in the outer raceway surface 2b of the inner-side row (2·Ri1/di) is designated as B1. Similarly, a groove diameter of curvature ratio in the inner raceway surface 6a of the inner-side row (2·Ri2/di) is designated as B2. Under the circumstances, it is set so that the outer-side groove diameter of curvature ratios (A1, A2) are smaller than the inner-side groove diameter of curvature ratios (B1, B2), A1<B1 and A2<B2.

Since the outer-side groove diameter of curvature ratios (A1, A2) are set smaller than the inner-side groove diameter of curvature ratios (B1, B2), A1<B1 and A2<B2, the contact bearing pressure (contact surface pressure) caused on the outer-side outer raceway surface 2a of the outer member 2 and on the inner raceway surface 5a of the wheel hub 5, by the contact of outer-side ball group 3 with said outer raceway surface 2a and inner raceway surface 5a, can be reduced. Thus, the strength and rigidity of the outer-side bearing row can be increased.

In addition the elliptical path of contact caused on the inner-side outer raceway surface 2b of the outer member 2 and on the inner raceway surface 6a of the inner ring 6, by the contact of inner-side ball group 4 with the outer raceway surface 2b and inner raceway surface 6a, can be minimized. Thus, it is possible to prevent a phenomenon of "over-riding on shoulder". This is a phenomenon of the elliptical path of contact of the ball group 4 riding over the shoulders of the outer and inner raceway surfaces 2b, 6a and coming out therefrom. Accordingly, although the inner-side bearing row is disadvantageous in view of the moment load because of the pitch circle diameter PCDi of the inner-side ball group 4 being smaller than the pitch circle diameter (PCDo) of the outer-side ball group 3, an "edge load" phenomenon that would be caused by the "over-riding on shoulder" phenomenon can be prevented. Thus, it is possible to extend the life of the bearing apparatus. The "edge load" phenomenon is an excessive stress concentration caused in a corner, etc. of a member and forming a one factor sometimes causing the premature peeling of a member.

By adopting the configuration described above, an initial contacting angle $\alpha o$ of the outer-side ball 3 in the outer-side bearing row can be obtained as $\alpha o = \cos^{-1}(1-e/2 \cdot Fo)$. An initial contacting angle $\alpha i$ of the inner-side ball 4 in the inner-side bearing row can be obtained as $\alpha i = \cos^{-1}(1-e/2 \cdot Fi)$. $Fo = Ro1 + Ro2 - do$, $Fi = Ri1 + Ri2 - di$, where "e" denotes one half of a radial gap. Accordingly, the value of Fi becomes large (Fi>Fo) in the inner-side bearing row where the groove diameter of curvature ratios B1, B2 are larger than those of the outer-side bearing row. As a result, the initial contacting angle $\alpha i$ in the inner-side bearing row becomes larger than the initial contacting angle $\alpha o$ in the outer-side bearing row ($\alpha i > \alpha o$). Accordingly, the allowable thrust load, when a thrust load is applied to the inner ring 6 can be increased. Thus, it is possible to extend the life of the inner-side bearing row.

The vehicle wheel bearing apparatus of the present disclosure can be applied to any of the bearing apparatus of the first through fourth generations irrespective of the driving wheel or the driven wheel.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member formed with double row outer raceway surfaces on its inner circumference;
   an inner member formed with double row inner raceway surfaces on its outer circumference surface, said double row inner raceway surfaces arranged opposite to the double row outer raceway surfaces;
   double ball groups are freely rollably contained between the outer raceway surfaces and inner raceway surfaces, respectively, of the outer member and the inner member;
   said members are formed as a double row angular contact ball bearing of back-to-back duplex type where a predetermined contact angle is applied to each ball;
   a pitch circle diameter of the outer-side ball group is larger than a pitch circle diameter of the inner-side ball group; and
   outer-side groove diameter of curvature ratios are smaller than inner-side groove diameter of curvature ratios.

2. The vehicle wheel bearing apparatus of claim 1 wherein the diameter of each outer-side ball is smaller than the diameter of each inner-side ball.

3. The vehicle wheel bearing apparatus of claim 1, wherein the number of the outer-side balls is larger than the number of the inner-side balls.

4. The vehicle wheel bearing apparatus claim 1, wherein the inner member includes a wheel hub with a wheel mounting flange at its one end, said wheel hub is formed on its outer circumference surface with one inner raceway surface arranged opposite to one of the double row outer raceway surfaces and a cylindrical portion axially extends from the inner raceway surface, via a tapered shaft-shaped portion, an inner ring is press fit onto the cylindrical portion via a predetermined interference, said inner ring is formed on its outer circumference surface with the other inner raceway surface arranged opposite to the other of the double row outer raceway surfaces, a substantially conical recess is formed on the outer-side end of the wheel hub, a depth of the recess extends to at least a position near a bottom of the inner raceway surface of the wheel hub, and the recess is formed so that a wall thickness of the wheel hub at its outer-side end portion is substantially constant.

5. The vehicle wheel bearing apparatus of claim 4, wherein a predetermined hardened layer is formed on the outer circumference of the wheel hub in a region including the inner raceway surface of the wheel hub from a base portion of the wheel mounting flange to the cylindrical portion by high frequency induction quenching.

* * * * *